(12) United States Patent
Tajima et al.

(10) Patent No.: US 9,160,529 B2
(45) Date of Patent: Oct. 13, 2015

(54) SECRET COMMUNICATION SYSTEM AND METHOD FOR GENERATING SHARED SECRET INFORMATION

(75) Inventors: Akio Tajima, Tokyo (JP); Akihiro Tanaka, Tokyo (JP); Wakako Maeda, Tokyo (JP); Seigo Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 923 days.

(21) Appl. No.: 11/505,814

(22) Filed: Aug. 18, 2006

(65) Prior Publication Data

US 2007/0230688 A1    Oct. 4, 2007

(30) Foreign Application Priority Data

Aug. 18, 2005    (JP) ................................. 2005-237284

(51) Int. Cl.
*H04L 9/08* (2006.01)
*H04B 10/70* (2013.01)

(52) U.S. Cl.
CPC ............ *H04L 9/0858* (2013.01); *H04L 9/0891* (2013.01); *H04B 10/70* (2013.01)

(58) Field of Classification Search
CPC ........................... H04L 9/0852; H04L 9/0858
USPC ............. 380/30, 277, 278, 283, 44; 713/166; 705/52
See application file for complete search history.

(56) References Cited

U.S. PATENT DOCUMENTS 6,078,663 A *    6/2000  Yamamoto .................... 380/260
6,473,858 B1 *  10/2002  Shimomura et al. .......... 713/150
6,834,348 B1 * 12/2004  Tagawa et al. ................ 713/193
7,260,222 B2 *   8/2007  Ishizuka et al. ............... 380/255
7,349,545 B2 *   3/2008  Kim .............................. 380/283

(Continued)

FOREIGN PATENT DOCUMENTS

EP          0 592 808 A2       8/1993
EP          1022685 A2 *       7/2000

(Continued)

OTHER PUBLICATIONS

Charles H. Bennett, et al., "Quantum Cryptography: Public Key Distribution and Coin Tossing," International Conference on Computers, Systems & Signal Processing, (Dec. 1984), India, pp. 175-179.

(Continued)

*Primary Examiner* — Zachary A Davis
(74) *Attorney, Agent, or Firm* — Arent Fox LLP (57) ABSTRACT

A user request can be reflected in the degree of security of an updated key in quantum key distribution. A sender and a receiver are connected through optical fiber. A quantum transmitter in the sender and a quantum receiver in the receiver carry out basis reconciliation and error correction through a quantum channel, based on a source of a key sent from the quantum transmitter and on a raw key received by the quantum receiver. Under the control of security control sections in the sender and receiver, the amount of information having the possibility of being intercepted, which is determined in accordance with a degree of security requested by a user, is removed from the key information after error correction, whereby a final cryptographic key is generated. Secret communication is performed between encryption/decryption sections in the sender and receiver by using the cryptographic key thus updated.

18 Claims, 10 Drawing Sheets

(56) References Cited

U.S. PATENT DOCUMENTS

| | | | |
|---|---|---|---|
| 7,653,199 B2* | 1/2010 | Renes | 380/256 |
| 7,869,599 B2 | 1/2011 | Tajima | |
| 8,041,039 B2* | 10/2011 | Tajima et al. | 380/279 |
| 2003/0063751 A1* | 4/2003 | Bruen et al. | 380/278 |
| 2005/0259825 A1* | 11/2005 | Trifonov | 380/277 |

FOREIGN PATENT DOCUMENTS

| | | | |
|---|---|---|---|
| JP | 8-279807 A | | 10/1996 |
| JP | 9-016679 A | | 1/1997 |
| JP | 2000-174747 | | 6/2000 |
| JP | 2001-175167 A | | 6/2001 |
| JP | 2002-300158 | | 10/2002 |
| JP | 2002-344438 | | 11/2002 |
| JP | 2005-117512 A | | 4/2005 |
| WO | WO-2005/053219 A1 | | 6/2005 |
| WO | WO 2005117330 A2 * | | 12/2005 |

OTHER PUBLICATIONS

G. Ribordy, et al., "Automated 'plug & play' quantum key distribution," Electronics Letters, vol. 34, No. 22, (1998), pp. 2116-2117.

G. Brassard, et al., "Secret-key Reconciliation by Public Discussion," in Advances in Cryptology—EUROCRYPT '93 Proceedings, Lecture Notes in Computer Science, vol. 765, pp. 410-423.

Charles Bennett, et al., "Generalized Privacy Amplification" IEEE Transactions on Information Theory, vol. 41, No. 6 (1995), pp. 1915-1923.

A. Tanaka, et al., "Temperature independent QKD system using alternative-shifted phase modulation method," Proceedings of European Conference on Optical Communication 2004, pp. 1-2.

Information-technology Promotion Agency, Problems with B92 Protocol, Review report on study and development of next-generation cryptography and authentication schemes—review and study report on quantum cryptography-, [online], Mar. 2001, [retreived on Aug. 8, 2011], pp. 42-46, Internet <URL: http://www.ipa.go.jp/security/fy12/report/ryoushi.pdf>.

Lutkenhaus, N.; "Security against individual attacks for realistic quantum key distribution"; Physical Review A, 2000, vol. 61, No. 5, pp. 052304-1-052304-10.

Tomita, Akihisa.; "Quantum Information Processing Paradigm: 2. Quantum Cryptography"; Communications of the Operations Research Society of Japan, 2002, vol. 47, No. 5, pp. 322-327.

* cited by examiner

FIG. 4A (SIMULATION SYSTEM)

SECRET COMMUNICATION SYSTEM AND METHOD FOR GENERATING SHARED SECRET INFORMATION

BACKGROUND OF THE INVENTION

1. Field of the Invention

The present invention relates to a secret communication system and, more particularly, to a system and method for allowing a sender and a receiver to share secret information.

2. Description of the Related Art

The internet has become the economic and social infrastructure over which various data are exchanged. Therefore, it is an important issue to devise preventive measures to protect data flowing over networks from risks of eavesdropping. One of the preventive measures is a secret communication system by which data for communication is encrypted. For encryption methods, there are two kinds of schemes: secret-key cryptography and public key cryptography.

Secret-key cryptography, as is typified by AES (Advanced Encryption Standard), is a scheme that uses a common encryption key for both encryption and decryption, and is capable of high-speed processing. For this reason, this scheme is used to encrypt data itself.

On the other hand, public key cryptography, as is typified by RSA (Rivest Shamir Adleman), is a scheme based on a one-way function, using a public key for encryption and a private key for decryption. Since this scheme is not suitable for high-speed processing, it is used to distribute a cryptographic key for the secret key scheme.

In secret communication where secrecy is ensured by encrypting data, an important thing to ensure the secrecy is that encrypted data cannot be broken even if the encrypted data is intercepted by an eavesdropper. To do so, it is necessary not to consecutively use the same key for encryption. This is because the consecutive use of the same key for encryption may increase the possibility that the encryption key is estimated based on the increased amount of intercepted data.

Accordingly, it is required to update an encryption key shared between a sender and a receiver. It is indispensable that the key being updated is not intercepted and broken during key update. Therefore, to update the key, there are two broad types of methods: (1) a method in which the key is encrypted for transmission by the public key cryptography, and (2) a method in which the key is encrypted for transmission by using a master key that is a common key preset for key update. (For example, see Japanese Patent Application Unexamined Publication Nos. 2002-344438 and 2002-300158.) The security according to these methods depends on the fact that an enormous amount of calculation is required for cryptanalysis.

On the other hand, quantum key distribution (QKD) technology, unlike ordinary (classical) optical communications, is a technology that allows a sender and a receiver to generate and share a cryptographic key by the transmission of a single photon per bit. This is a cryptographic-key-sharing technology that makes eavesdropping impossible, which has been proved on the basis of quantum mechanics (see Bennett, C. H., and Brassard, G., "QUANTUM CRYPTOGRAPHY: PUBLIC KEY DISTRIBUTION AND COIN TOSSING" IEEE International Conference on Computers, Systems, and Signal Processing, Bangalore, India, Dec. 10-12, 1984, pp. 175-179 (hereinafter, this document will be referred to as Bennett and Brassard), and Ribordy, G., Gauiter, J., Gisin, N., Guinnard, O., and Zbinden, H., "Automated 'plug & play' quantum key distribution" Electron Letters, Vol. 34, No. 22 (1998), pp. 2116-2117). However, since no perfect single-photon sources exist yet, single-photon transmission is achieved in practice by attenuating coherent light so that the mean number of photons per pulse becomes one or smaller, that is, the probability of the presence of two or more photons per pulse is reduced.

Here, one of the most typical quantum key distribution algorithms, called the BB84 protocol, will be described briefly with reference to Bennett and Brassard.

Figure 1:
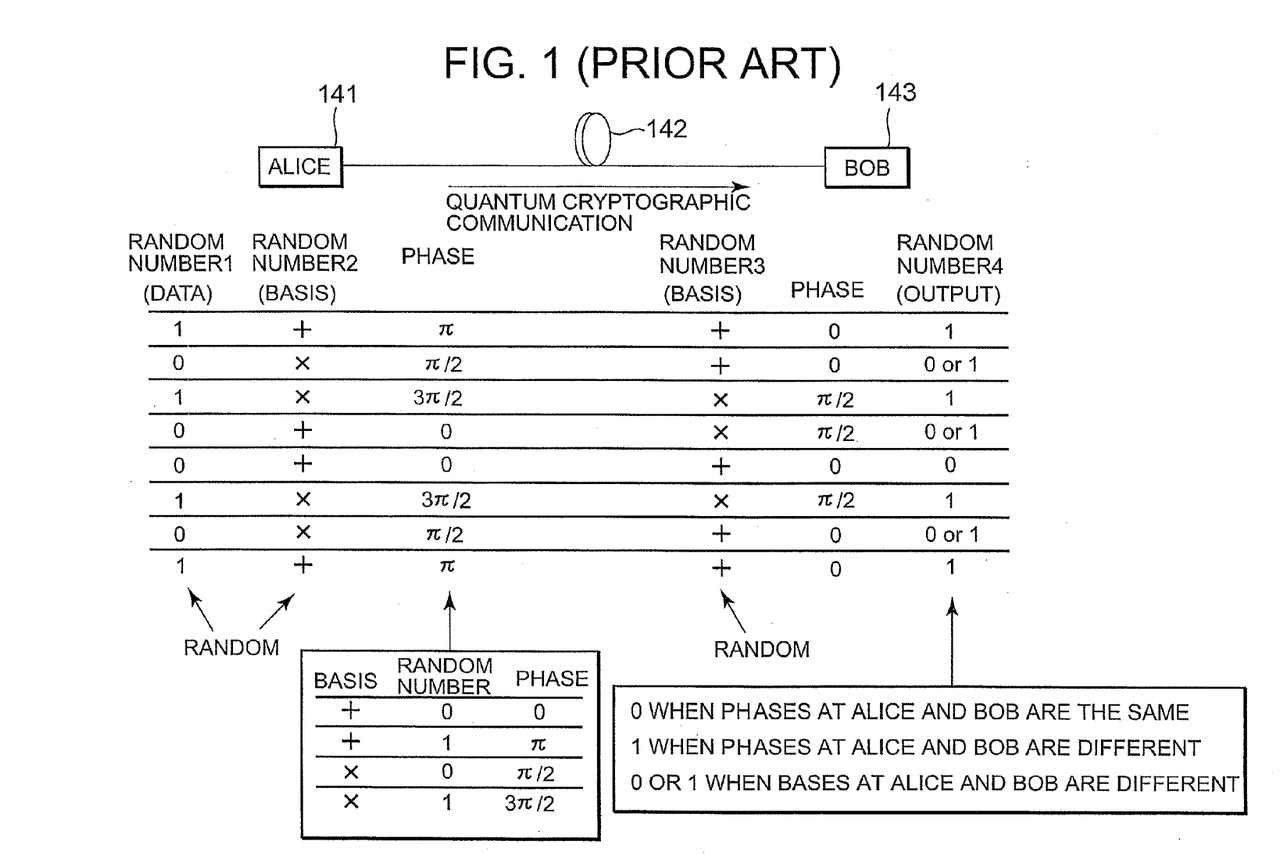
FIG. 1 is a schematic diagram showing a concept of a quantum key distribution method according to the BB84 protocol.

FIG. 1 is a schematic diagram showing a concept of a quantum key distribution method according to the BB84 protocol. It is assumed here that Alice (sender) 141 and Bob (receiver) 143 are connected through an optical transmission line 142. According to this method, Alice 141 has two random number sources, one of which (random number 1) provides source data of a cryptographic key, and the other one of which (random number 2) provides bases. Alice 141 randomly performs any one of four types of modulation $(0, \pi/2, \pi, 3\pi/2)$ on each single photon depending on a combination of the random numbers, and sends it to Bob 143.

On the other hand, Bob 143 has a random number source (random number 3) corresponding to bases. When a value of the random number 3 is "0," Bob 143 performs a modulation of a phase of 0 (+basis) on a photon sent from Alice 141. When a value of the random number 3 is "1," Bob 143 performs a modulation of a phase of $\pi/2$ (x basis) on a photon sent from Alice 141. Thus, when bases used for modulation at Alice 141 and Bob 143 are the same (random number 2=random number 3), Bob 143 can correctly detect a corresponding value of the random number 1 (random number 1=random number 4). When bases are different (random number 2≠random number 3), Bob 143 randomly obtains 0/1 as a value of the random number 4, independently of a value of the random number 1. Since each of the random numbers 1, 2 and 3 is a sequence of random numbers that vary with each one bit, the probability that a match of bases occurs and the probability that no match of bases occurs are both 50%. However, since those bits corresponding to non-matching bases are removed in basis reconciliation at a subsequent stage, Alice 141 and Bob 143 can share a bit string of 0s and 1s based on the random number 1.

Figure 2:
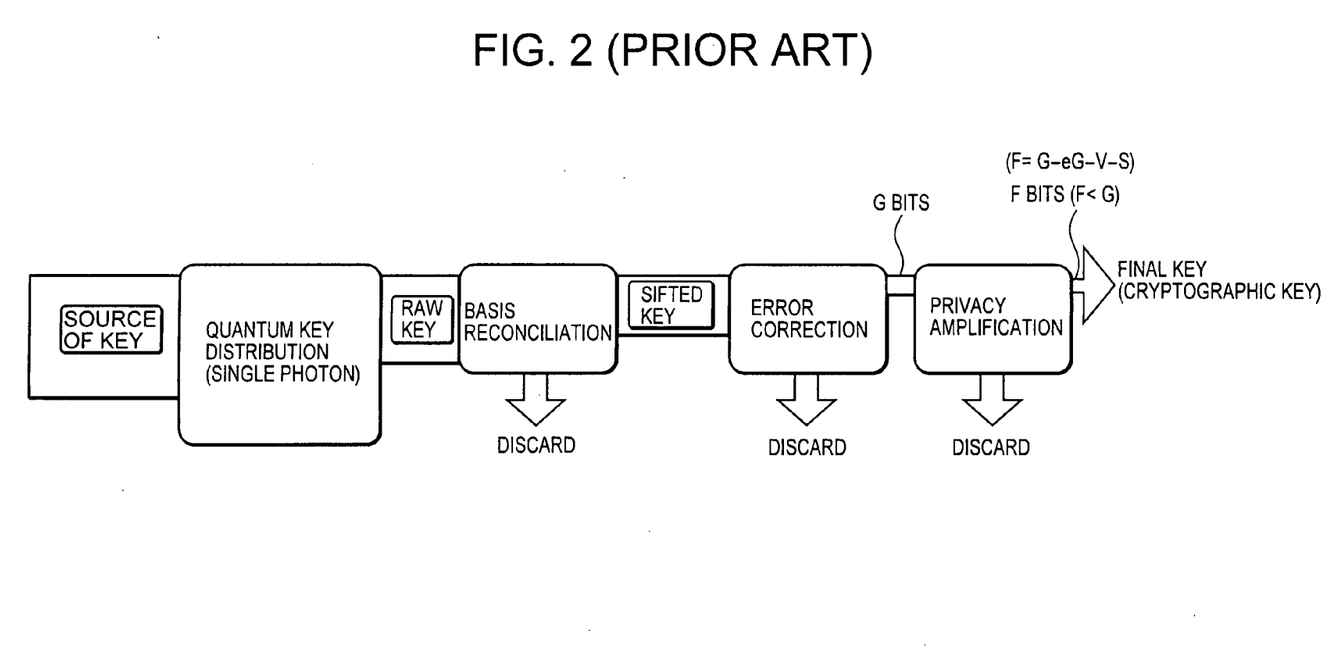
FIG. 2 is a flowchart showing a flow of quantum key generation in general.

FIG. 2 is a flowchart showing a flow of quantum key generation in general. As described above, through quantum key distribution, an output of 0 or 1 (raw key) is obtained depending on the difference between the depths of phase modulation at Alice and Bob, and thereafter, by checking part of the bases used, a string of bits (sifted key) corresponding to matching bases is shared (basis reconciliation). As regards a prior art, Japanese Patent Application Unexamined Publication No. 2000-174747 discloses a quantum cryptography device that allows a sender and a receiver to share a sifted key by using a quantum channel and a classical channel.

However, the bit string shared as described above contains errors attributable to the transmission line 142 and/or receiver. Accordingly, error correction processing is required to correct these errors. In addition to this, an error also occurs in the shared bit string when an eavesdropper present on the transmission line intercepts the photon information. Therefore, to share a cryptographic key for final use, not only the error correction processing to correct errors, but also privacy amplification processing is required to reduce the amount of information that can be supposed to have been intercepted, based on the frequency of errors (error rate).

(Error Correction)

For the error correction processing, for example, a method as described in Brassard, G., and Salvail, L., "Secret-key Reconciliation by Public Discussion" in Advances in Cryptology—EUROCRYPT '93 Proceedings, Lecture Notes in Computer Science, Vol. 765, PP. 410-423, can be employed. According to this method, error correction is performed in such a manner that a bit string as a sifted key is divided into a plurality of blocks in each of a sender and a receiver, a block containing an error is located by checking the parity of each block, and the error is corrected by, for example, applying a Hamming code to the block in question. In addition, on the assumption that an even number of errors might be contained in one block, the bit string is permuted at random, and then parity check and error correction are performed again. Such work is repeated multiple times (V times), thereby detecting an error remaining in the secret bit string. For example, assuming that the number of parity check bits is approximately half the number of the bits in the sifted key, when parity check is repeated V times, the probability that a remaining error cannot be detected is $1/2^V$ or lower. Since V-bit information has been leaked to a third party by such release of parity bits, these V bits are discarded from the key. Through this error correction process, G-bit key information is assumed to remain.

(Privacy Amplification)

For the privacy amplification processing, a method as described in Bennett, C. H., Brassard, G., Crepeau, C., and Maurer, U. M., "Generalized Privacy Amplification" IEEE Transactions in Information Theory, Vol. 41, No. 6 (1995), pp. 1915-1923, can be employed. The privacy amplification processing is a process for generating new random numbers by removing the amount of information that has the possibility of being leaked during key distribution. Here, the G-bit key information is sifted to yield a key of F bits (F<G). A specific procedure is as follows.

Alice generates random numbers (parity-calculation bits) inside and, for the G-bit key information Alice maintains, calculates the parity of bits at positions designated by the generated random numbers. Alice sets the calculated parity bit as the first bit of a key and sends these random numbers (parity-calculation bits) to Bob. Based on the received random numbers, Bob calculates parity for the G-bit key information Bob maintains, and sets that parity bit as the first bit of a key. By repeating such work, as much information as conceivably intercepted on the way along the transmission line is discarded, thereby creating a new F-bit final key. An eavesdropper cannot gain knowledge of new random numbers (final key) after privacy amplification unless she knows all the parity-calculation bits.

In the case where privacy amplification processing as described above is performed on G-bit key information after error correction to generate as many new random numbers as F bits, the number of bits, F, corresponding to the new random numbers is represented by the following equation:

$$F=G-eG-V-S.$$

Here, e is the proportion of the information stolen by an eavesdropper intercepting the quantum communication. Therefore, it can be thought that the eavesdropper, Eve, possesses eG-bit information. V is the number of bits released in the process of remaining-error detection. S is a security parameter for privacy amplification. The larger the value of S, the closer to the perfect secrecy.

When an encryption key shared between a sender and a receiver is updated, there are several possible methods as described above, such as sending the updated key after encrypting it by the public key cryptography, or sending the updated key after encrypting it by using a common key preset for update. The security according to these methods is based on the fact that an enormous amount of calculation is required to break the encrypted key. Therefore, there has been a problem that the secrecy is degraded with improvement in cryptanalysis technology, such as improvement in computer power and improvement in cryptanalysis algorithms. For example, in the 56-bit DES challenge contests where teams compete in time to break DES (Data Encryption Standard), which is a common key cipher, although it took 96 days to break DES in 1997, the time was reduced to 22 hours in 1999. As for a public key cipher, although it took eight months to break a RSA public key cipher with a key length of 429 bits in 1994, it took about three months to break one with a key length of 576 bits in 2004. As described above, the cryptanalysis technology has been improving.

On the other hand, the quantum key distribution (QKD) technology has been studied and developed with an eye to implementing more secure systems. Accordingly, for the security of a key, attention has been focused only on the fact that whatever the attack, eavesdropping proves completely unsuccessful theoretically. For this reason, in QKD, the mean number of photons per pulse is fixed at 1.0 or smaller.

One of conceivable eavesdropping strategies in QKD is a photon-number splitting (PNS) attack, which is thought of as the most powerful attack at the present time. The PNS attack is a strategy in which one photon is stolen from a pulse including two or more photons, and further in the case of a pulse including one photon, information is stolen by entangling a photon. However, this strategy is difficult to realize, even unrealistic.

For a relatively realistic eavesdropping strategy, an intercept/resend attack is known in which Eve disguises herself as Bob to receive a signal from Alice and as Alice to send it on to Bob. If this eavesdropping is present, the error rate is, in principle, 25%. Also known is a strategy in which one photon is stolen from a pulse including two or more photons (beam splitting attack 1). However, according to this eavesdropping strategy, eavesdropping can be easily detected because the number of photons arriving at Bob is reduced. In addition, there is also a strategy in which an optical link from Alice to Bob is optically split at some point between Alice and Bob, and a part from this point to Bob is replaced with a lossless transmission link, thereby intercepting as much of the optical signal as is equivalent to the loss of transmission from the split point to Bob (beam splitting attack 2). However, this strategy is unrealistic in the lossless transmission link. Further, for another strategy that is difficult to realize, an individual (incoherent) attack is also known in which Eve entangles a photon with a photon being transmitted to copy the quantum state, thereby intercepting a small amount of information. If this individual (incoherent) attack only is applied, the amount of intercepted information does not depend on the number of photons. The above-mentioned PNS attack is the combination of the beam splitting attack 2 and the individual (incoherent) attack.

Figure 3:
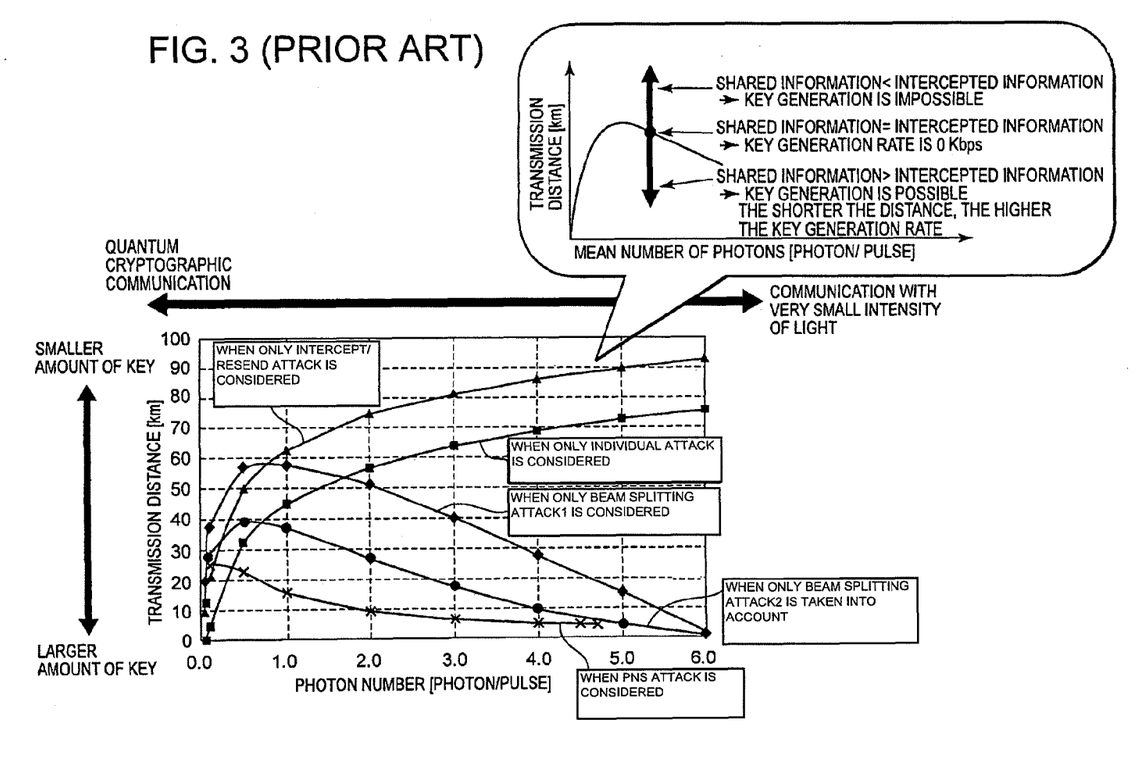
FIG. 3 is a graph schematically showing the relationship between the mean number of photons and the transmittable distance in a quantum key distribution system, for each different eavesdropping strategy.

FIG. 3 is a graph schematically showing the relationship between the mean number of photons and the transmittable distance in a quantum key distribution system, for each different eavesdropping strategy. Each curve for its corresponding eavesdropping strategy indicates the border where, under the assumption that the eavesdropping strategy in question is performed, the amount of information shared between Alice and Bob becomes equal to the amount of information intercepted by Eve, in which case the key generation rate is zero. Where the transmission distance is longer than the distance indicated by the curve, the amount of intercepted information is larger, and it is impossible to generate a key. Where the transmission distance is shorter than the distance indicated by the curve, the amount of shared information is larger, and it is possible to generate a key. Additionally, the shorter the transmission distance, the higher the key generation rate.

From the viewpoint of the transmission distance, it is preferable to keep the mean number of photons per pulse much smaller than 1.0, in the case of seeking for the security at the level of beating the PNS attack. However, as can be seen from this graph, for the security at the level of beating the beam splitting attack 1, even if the mean number of photons is 1.0 to 4.0, it is possible to cover some transmission distance.

In other words, although it is necessary to set the number of photons per optical pulse at 1.0 or smaller in order to beat an attack of PNS class, the security of such highest level is not always required. Some users might put a higher priority on the transmission distance, key update rate, or amount of key, even if the security is sacrificed to some degree. In conventional quantum key distribution systems, it has been impossible to reflect a user request in the security of such an updated key.

SUMMARY OF THE INVENTION

The present invention has been achieved to solve the above-described conventional problem. The present inventors have focused attention on the following points.

(1) As the number of photons per optical pulse becomes larger, the amount of information that can be transmitted is increased, but the possibility that the information is intercepted by a third party becomes greater (hence, reduced security). Inversely, as the number of photons is reduced, the amount of information that can be transmitted is reduced, and the security is increased.

(2) In the privacy amplification processing, as described above, the amount of key after privacy amplification (the number of bits corresponding to new random numbers), F, can be obtained by subtracting eG-bit information, which is supposed to be possessed by an eavesdropper Eve, from G-bit key information after error correction (i.e., $F=G-eG-V-S$, where V is the number of bits released during the process of remaining-error detection, and S is a security parameter.) Here, it is preferable to use e, which is the proportion of eavesdropping possibility, as a parameter in which a user request is reflected. It is also possible to vary both the proportion of eavesdropping possibility, e, and the security parameter, S.

That is, it will be possible to distribute a cryptographic key with a key length/key update rate and a degree of security according to user's designation, by making it possible to vary, in accordance with a user request, the mean number of photons per optical pulse, and/or the proportion of eavesdropping possibility e or security parameter S in privacy amplification processing.

According to the present invention, secret information shared between a first communication device and a second communication device is generated by: a) setting a degree of security for the shared secret information; b) the first communication device transmitting first secret information through a communication channel and the second communication device receiving second secret information through the communication channel; c) the first and second communication devices both generating third secret information from the first secret information and second secret information; and d) removing an amount of information determined according to the degree of security from the third secret information.

As described above, the final shared secret information which is shared between the first and second communication devices is obtained by removing the amount of information determined according to the degree of security from the third secret information. Accordingly, the shared secret information (e.g. shared cryptographic key) can be generated, which has the degree of security and the amount of information according to a user's request or designation. In other words, the degree of security of the shared cryptographic key and the length or update rate of the shared cryptographic key can be set depending on the user's request. In addition, charging for the communication using the shared cryptographic key can be made depending on the user's request.

In an embodiment of the present invention, when the shared secret information is updated, the steps of b) to d) or the steps of a) to d) are performed. Communication using the shared secret information can be charged for depending on the degree of security set for the shared secret information.

In another embodiment of the present invention, a plurality of pieces of shared secret information is generated by repeating the a) to d) and is stored in a memory. When the shared secret information is updated, one piece of shared secret information is selected from the plurality of pieces of shared secret information to use a selected one as new shared secret information. Preferably, the pieces of shared secret information are grouped under a plurality of degrees of security.

From the viewpoint of each communication device, the communication device includes: a security controller for setting a degree of security for the shared secret information; a first information generator for generating first secret information from second secret information and third secret information, wherein one communication device transmits the second secret information through a communication channel and the other communication device receives the third secret information through the communication channel, and a second information generator for generating the shared secret information by removing an amount of information determined according to the degree of security from the first secret information.

The communication device may further include a secret communication section for encrypting and decrypting a user signal using the shared secret information.

According to an embodiment of the present invention, the secret communication system is further provided with a memory for storing a plurality of pieces of shared secret information which are previously generated; and a secret information controller for selecting one from the plurality of pieces of shared secret information when the shared secret information is updated. Alternatively, the secret communication system is further provided with a memory for storing a plurality of pieces of shared secret information which are previously generated, wherein the plurality of pieces of shared secret information are grouped under a plurality of degrees of security; and a secret information controller for selecting one from the plurality of pieces of shared secret information depending on the degree of security when the shared secret information is updated.

Preferably, the plurality of communication channels are multiplexed on an optical fiber transmission line, wherein the shared secret information is generated based on a quantum key distribution procedure. More preferably, the second information generator performs privacy amplification processing, wherein the security controller changes a proportion of the amount of information in the privacy amplification processing depending on the degree of security.

The first communication device may further include a variable attenuator for changing the means number of photons in an optical pulse on the communication channel under control of the security controller.

DETAILED DESCRIPTION OF THE PREFERRED EMBODIMENTS

1. Simulation on Assumption of PNS Attack

Hereinafter, basic operations of the present invention will be described on the assumption that an eavesdropper, Eve, carries out a PNS attack. Note that the basic operations are substantially the same even if other eavesdropping strategies are assumed.

Figure 4A:
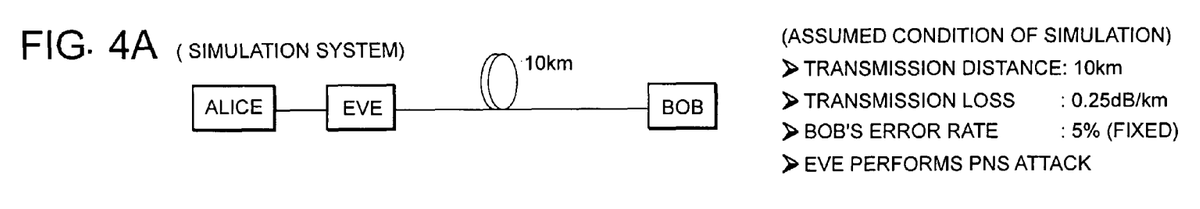
FIG. 4A is a block diagram showing a simulation system.
Figure 4B:
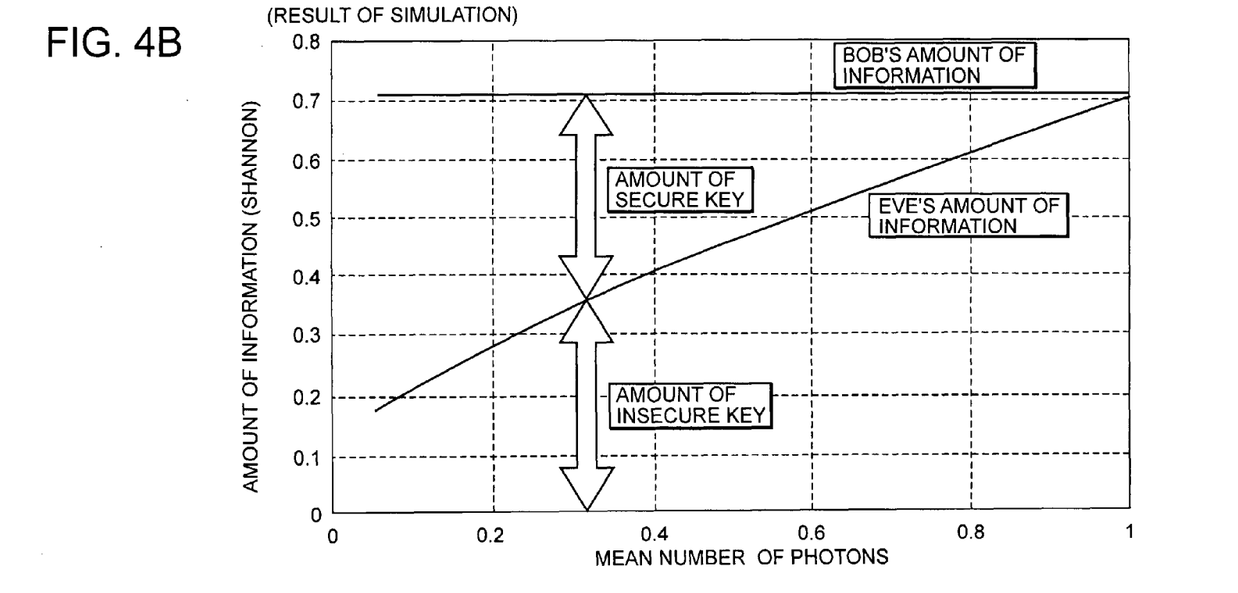
FIG. 4B is a graph showing a result of simulation performed by the simulation system.

FIG. 4A is a block diagram showing a simulation system, and FIG. 4B is a graph showing a result of simulation performed by the simulation system. Here, it is assumed that an eavesdropper, Eve, who carries out a PNS attack is present between Alice and Bob, and that the transmission distance, transmission loss, and Bob's error rate are 10 km, 0.25 dB/km, and 5% fixed, respectively. Note that in the graph of FIG. 4B, the Bob's amount of information, which increases with an increase in the mean number of photons, is used as the reference.

As shown in FIG. 4B, the proportion of the amount of information Eve has supposedly intercepted, that is, the amount of insecure key, to the amount of information Bob receives increases with an increase in the mean number of photons. At a mean number of photons of 1.0, the Bob's amount of information becomes substantially equal to the Eve's amount of information. In other words, as the mean number of photons increases, the amount of key that is secure against a PNS attack decreases, and when the means number of photons becomes 1.0, Bob cannot receive secure key information.

To beat such a PNS attack, it is necessary that the mean number of photons should be set at 1.0 or smaller, and that the amount of information, eG, that has the possibility of being leaked in the privacy amplification processing should be removed, thereby obtaining a secure final key. However, not all the Eve's amount of information, eG, needs to be removed when such high security as to beat an attack of PNS class is not required. As will be described later, the trade-off between the degree of security and the amount of key (key generation rate) can be controlled in accordance with a user request, by varying the mean number of photons, $\mu$, and the proportion of removed information, eD.

2. Control of Degree of Security/Amount of Key

Figure 5:
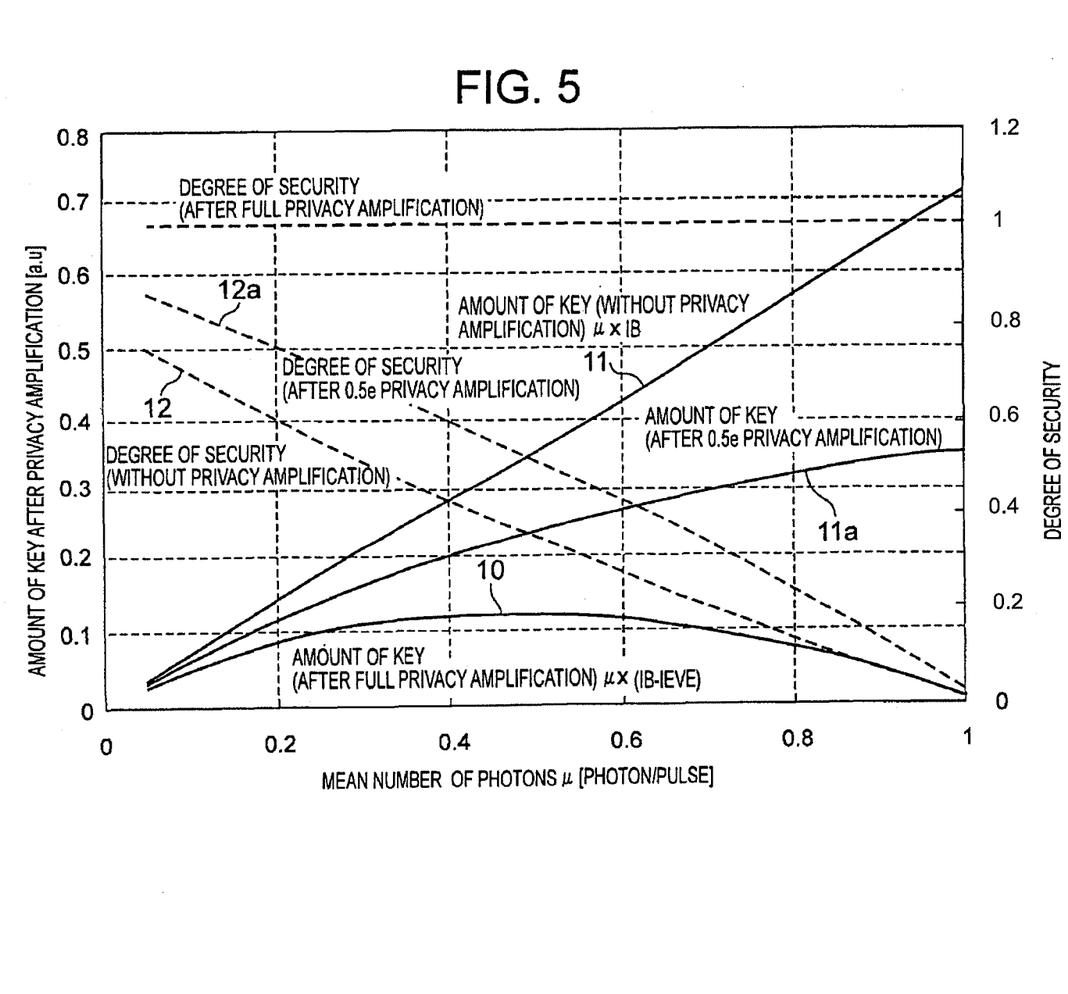
FIG. 5 is a graph showing the amount of key and the degree of security after privacy amplification, varying with the mean number of photons.

FIG. 5 is a graph showing the amount of key and the degree of security after privacy amplification, varying with the mean number of photons. Referring to FIG. 5, under the assumption of a PNS attack, a curve 10 shows the amount of key after full privacy amplification, varying with the mean number of photons; a curve 11 shows the amount of key without privacy amplification, varying with the mean number of photons; a curve 11a shows the amount of key after 0.5e privacy amplification, varying with the mean number of photons; a curve 12 shows the varying degree of security, corresponding to the curve 11; a curve 12a shows the varying degree of security, corresponding to the curve 11a. Note that $\mu$ represents the mean number of photons, IB represents the Bob's amount of information (amount of key), and IEVE represents the Eve's amount of information (amount of key that has the possibility of being intercepted).

The amount of key after full privacy amplification (curve 10) can be represented by "$\mu*$(IB–IEVE)," which corresponds to "F=G–eG." That is, the full privacy amplification is a privacy amplification for completely removing the amount of information intercepted by Eve. The amount of key without privacy amplification (curve 11) can be represented by "$\mu*$IB," which corresponds to "F=G." Assuming that the amount of information removed through privacy amplification is "eD*G," a privacy amplification setting, represented by an arbitrary curve between the curves 11 and 10, can be selected by varying eD in the range of 0 to e. The curve 11a in FIG. 5 indicates the variation in the amount of key when eD=0.5. By setting eD at an arbitrary value, it is possible to further reduce the amount of key below the curve 10 (to increase the security), or to further increase the amount of key above the curve 11 (to decrease the security).

Here, the degree of security is defined as the ratio of (amount of secure key) to (amount of remaining key after privacy amplification). Further, if it is set that (amount of secure key)=(1–e)G; and (amount of remaining key after privacy amplification)=(1–eD)G, then (degree of security)= (1–e)/(1–eD).

In the case of the full privacy amplification by which the amount of information intercepted by Eve is completely eliminated, eD=e, and therefore (degree of security)=1. In the case where no privacy amplification is performed, eD=0, and therefore (degree of security)=1–e. If the degree of security is defined as described above, it is possible to obtain a curve of the degree of security corresponding to a curve of the amount of key set by selecting a value of eD. The curve 12a in FIG. 5 indicates the variation in the degree of security when eD=0.5. As described above, it is possible to determine the amount of information removed in the privacy amplification processing, eD*G, and/or the mean number of photons, $\mu$, so that the cryptographic key can be updated at a degree of security requested by a user. Note that a privacy amplification setting can be selected also by varying the security parameter S. Hereinafter, a specific description will be given of a communication system to which the present invention is applied.

3. First Embodiment

Figure 6:
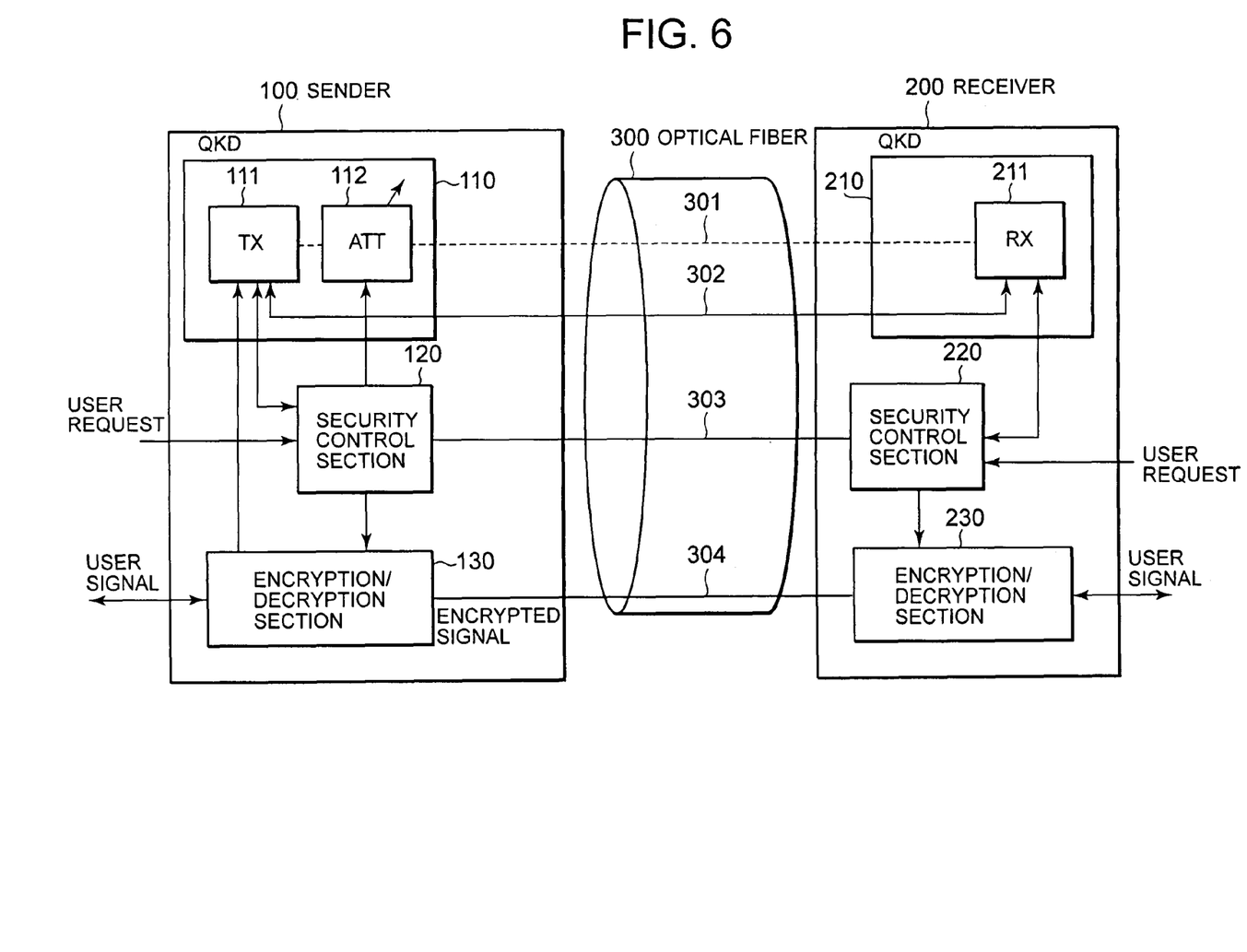
FIG. 6 is a block diagram showing a schematic configuration of a communication system according to a first embodiment of the present invention.

FIG. 6 is a block diagram showing a schematic configuration of a communication system according to a first embodiment of the present invention. By way of example, the present embodiment illustrates the case where a sender (Alice) 100 and a receiver (Bob) 200 are connected through an optical fiber transmission line 300.

The sender 100 includes a quantum key distribution (QKD) section 110, a security control section 120, and an encryption/decryption section 130. The QKD section 110 is provided with a QKD transmitter (TX) 111 and a variable optical attenuator (ATT) 112. The receiver 200 includes a quantum key distribution (QKD) section 210, a security control section 220, and an encryption/decryption section 230. The QKD section 210 is provided with a QKD receiver (RX) 211.

The security control section 120 controls the privacy amplification setting to be set on the TX 111 and the amount of attenuation to be set on the ATT 112, in accordance with a user request. The security control section 220 performs privacy amplification processing control on the RX 211, similar to the control on the TX 111.

In the sender 100, as described already, the TX 111 phase-modulates an optical pulse in accordance with a random number as a source of a key, and the phase-modulated optical pulse is attenuated by the ATT 112 and then transmitted to the receiver 200 through a quantum channel 301. In the receiver 200, the RX 211 phase-modulates the arriving optical pulse in accordance with a random number, and a raw key is detected through optical pulse interference. Subsequently, the TX 111 and RX 211 carries out the sequence of key generation, that is, the above-described basis reconciliation and error correction processing, through a classical channel 302, and further carries out the privacy amplification processing in accordance with the security control according to the present invention.

The security control section 120 in the sender 100 and the security control section 220 in the receiver 200 can communicate with each other through a classical channel 303. The security control section 120 in the sender 100 makes a privacy amplification setting (selects a value of eD) on the TX 111 in accordance with a user request, and further controls the amount of attenuation to be set on the ATT 112 if necessary. The selected value of eD is notified to the security control section 220 on the receiver side through the classical channel 303. The security control section 220 in the receiver 200 controls the privacy amplification processing at the RX 211, in accordance with the notified eD.

When a final cryptographic key is thus generated by the TX 111 and RX 112, the security control sections 120 and 220 each output the final cryptographic key to the encryption/decryption section 130 and 230, respectively. A user signal is encrypted and decrypted by using this cryptographic key. As described above, a cryptographic key can be updated in accordance with a degree of security and an amount of key, or a key generation rate, requested by a user. Therefore, a user's decision according to the circumstances can be reflected in the cryptographic key generation, and consequently, appropriate key update is possible.

Incidentally, a user on the receiver side may give a user request to the security control section 220. In this case, the security control section 220, similarly to the security control section 120, makes a privacy amplification setting (selects a value of eD) on the RX 211 in accordance with a user request and notifies the selected value of eD to the security control section 120 on the sender side through the classical channel 303. The security control section 120 in the sender 100 controls the privacy amplification processing at the TX 111 in accordance with the notified eD. Thereafter, similarly, when a final cryptographic key is generated by the TX 111 and RX 211, the security control sections 120 and 220 each output the final cryptographic key to the encryption/decryption sections 130 and 230, respectively, and a user signal is encrypted and decrypted by using this cryptographic key.

Note that it is obvious from the foregoing that the present invention is applicable to quantum key distribution systems in general. The application of the present invention is not limited to plug and play systems as shown in the undermentioned embodiments, but the present invention can also be applied to one-way transmission systems similarly.

Additionally, the above-described key generation process carried out by the TX 111 and RX 112, control by the security control sections 120 and 220, and operations of the encryption/decryption sections 130 and 230 can also be implemented by executing respective corresponding programs on a program-controlled processor or a computer.

3.1) First Example

A plug and play quantum key distribution (QKD) system will be described as a secret communication system according to a first example of the present embodiment.

Figure 7A:
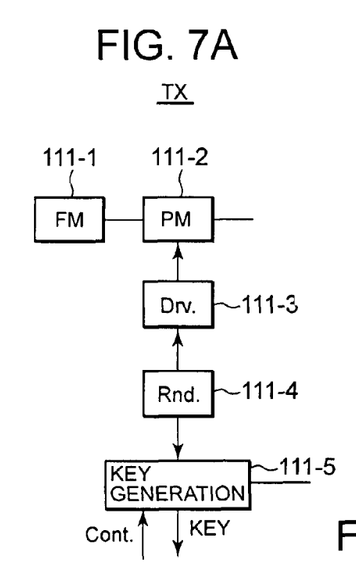
FIG. 7A is a block diagram showing an example of a TX on the sender side.
Figure 7B:
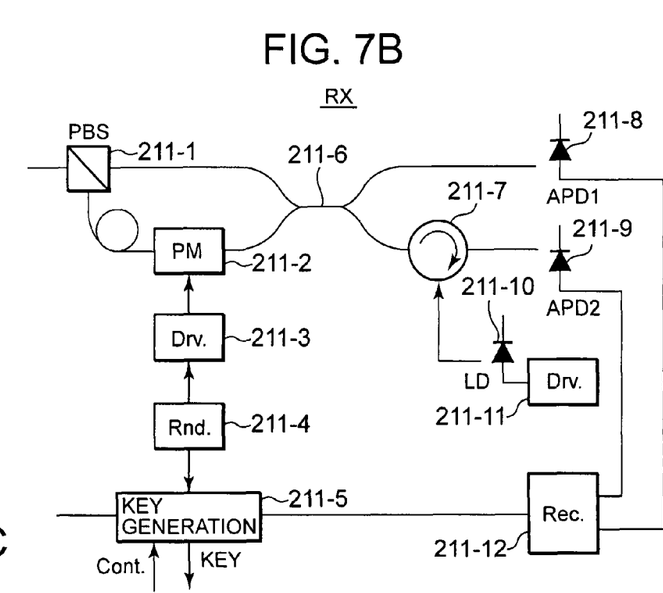
FIG. 7B is a block diagram showing an example of a RX on the receiver side.
Figure 7C:
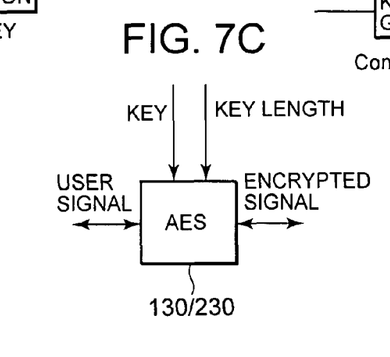
FIG. 7C is a block diagram showing an example of any one of encryption/decryption sections on the sender and receiver sides.

FIG. 7A is a block diagram showing an example of the TX 111 on the sender side, FIG. 7B is a block diagram showing an example of the RX 211 on the receiver side, and FIG. 7C is a block diagram showing an example of any one of the encryption/decryption sections 130 and 230 on the sender and receiver sides.

First, in the RX 211 on the receiver side, a laser light source 211-10 driven by a driver 211-11 outputs an optical pulse P, which is sent via a polarization-maintaining-type optical circulator 211-7 to a polarization-maintaining-type optical coupler 211-6, where the optical pulse P is split into two parts. One of the two parts, an optical pulse P1, goes along a short path to be sent to a PBS 211-1 directly, and the other one, an optical pulse P2, passes through a phase modulator 211-2, which is placed in a long path, and is sent to the PBS 211-1. These optical pulses P1 and P2 are combined at the PBS 211-1 and transmitted to the sender 100 as double pulses through a wavelength multiplexer/demultiplexer (not shown) and the quantum channel 301.

In the sender 100, the double pulses P1 and P2, arriving after passing through a wavelength multiplexer/demultiplexer (not shown) and the ATT 112, are reflected by a faraday mirror 111-1 with their polarizations rotated by 90 degrees individually. After the optical pulse P2 only is modulated by a phase-modulator 111-2, the double pulses P1 and P2 are returned to the receiver 200. The phase modulator 111-2 is driven by a driver 111-3, and the depth of phase modulation is any one of four phases $(0, \pi/2, \pi, 3\pi/2)$ depending on a random number generated by a random number generator 111-4. Hereafter, the phase-modulated optical pulse P2 is denoted by $P2^{*a}$.

Since the polarization state of each of the optical pulses P1 and $P2^{*a}$ received from the sender 100 has been rotated by 90 degrees, the PBS 211-1 in the RX 211 on the receiver side leads each of these received optical pulses to the other path that is different from the path the optical pulse used when it was transmitted to the sender. That is, the received optical pulse P1 goes along the long path and is phase-modulated by the phase-modulator 211-2. Then, the phase-modulated optical pulse $P1^{*b}$ arrives at the optical coupler 211-6. The phase modulator 211-2 is driven by a driver 211-3, and the depth of phase modulation at that time is any one of two phases $(0, \pi/2)$ depending on a random number generated by a random number generator 211-4. On the other hand, the optical pulse $P2^{*a}$ goes along the short path, which is different from the path it used at the time of transmission to the sender, and arrives at the same optical coupler 211-6.

In this manner, the optical pulse $P2^{*a}$ phase-modulated at the TX 111 and the optical pulse $p1^{*b}$ phase-modulated at the RX 211 interfere with each other, and the result of this interference is detected by any one of photon detectors, APDs 211-8 and 211-9. Detection data obtained by the APDs 211-8 and 211-9 are sequentially stored in a reception circuit 211-12 and output to a key generation section 211-5 as a raw key.

A key generation section 111-5 in the TX 111 and the key generation section 211-5 in the RX 211 carry out, through the classical channel 302, basis reconciliation and error correction according to the BB84 protocol as described already, and further carry out privacy amplification processing according to the present embodiment, in accordance with control signals (Cont.) from the security control sections 120 and 220, thereby sharing a cryptographic key according to a user request. The cryptographic key thus updated is output to each of the encryption/decryption sections 130 and 230.

The encryption/decryption section 130 encrypts a user signal by using the updated cryptographic key and transmits it to the receiver 200 through a classical channel 304. The encryption/decryption section 230 in the receiver 200 decrypts the received encrypted signal by using the updated cryptographic key. In the present embodiment, the encryption/decryption sections 130 and 230 conform to the AES (Advanced Encryption Standard) cryptography as shown in FIG. 7C. The length of the key is selected from 128, 192, and 256 bits in accordance with a user request. In addition, in the present embodiment, since the encryption communication is bi-directional communication, the system can be used also in such a manner that the encryption/decryption section 230 encrypts and transmits a user signal, and the encryption/decryption section 130 decrypts the encrypted signal. At this time, a user request concerning the cryptographic key to be updated is notified from the security control section 220 to the security control section 120 in the sender 100 through the classical channel 303. That request is reflected at the time of key update.

3.2) Second Example

A plug and play quantum key distribution system using a Vernam cipher and a PBS loop will be described as a secret communication system according to a second example of the present embodiment.

Figure 8A:
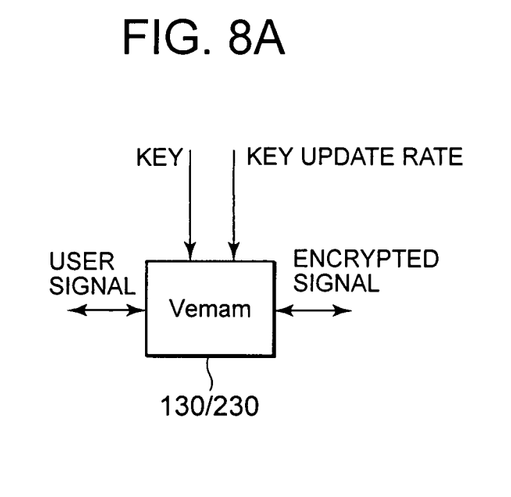
FIG. 8A is a block diagram showing another example of any one of the encryption/decryption sections on the sender and receiver sides.
Figure 8B:
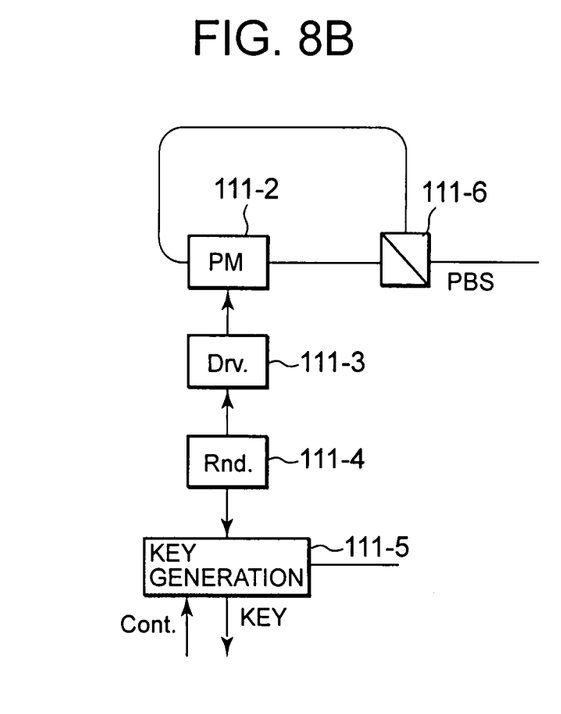
FIG. 8B is a block diagram showing another example of the TX on the sender side.

FIG. 8A is a block diagram showing another example of any one of the encryption/decryption sections 130 and 230 on the sender and receiver sides, and FIG. 8B is a block diagram showing another example of the TX 111 on the sender side. According to the present example, the encryption/decryption sections 130 and 230 use the Vernam cipher as shown in FIG. 8A. The Vernam cipher is a cipher in which the lengths of the plaintext and encryption key are identical. Therefore, the communication rate is substantially equal to the key update rate. The encryption/decryption sections 130 and 230 perform secret communication by using a Vernam cipher while controlling the data communication rate with information about the key update rate notified by the security control sections 120 and 220, respectively. The security control sections 120 and 220 set the key update rate at which the key is updated, based on a user request.

The TX 111 on the sender side is a QKD transmitter of an alternative-shifted phase modulation type as shown in FIG. 8B (see Tanaka, A., Tomita, A., Tajima, A., Takeuchi, T., Takahashi, S., and Nambu, Y., "Temperature independent QKD system using alternative-shifted phase modulation method" in Proceedings of European Conference on Optical Communication 2004, Tu4.5.3). Each of the double pulses P1 and P2 arriving from the receiver 200 as described above is further split into two at a PBS 111-6, resulting in four pulses (i.e., quartet pulses) including clockwise double pulses $P1_{CW}$ and $P2_{CW}$ and counterclockwise double pulses $P1_{CCW}$ and $P2_{CCW}$. Each pair passes through a phase modulator 111-2 in the direction opposite to the other pair and enters a PBS port that is different from a port from which the pair was output.

The phase modulator 111-2 phase-modulates the pulse $P2_{CW}$, which is the following one of the clockwise double pulses, with respect to the preceding pulse $P1_{CW}$ and, at the same time, gives a phase difference of π between the clockwise double pulses and the counterclockwise double pulses. The phase modulator 111-2 is driven by a driver 111-3 in accordance with random numbers from a random number generator 111-4 and performs a phase modulation on each of the quartet pulses.

The quartet pulses thus phase-modulated are combined at the PBS 111-6, returning to the double pulses again. As mentioned above, since only the following pulse is phase-modulated in accordance with the transmission information, the output double pulses are denoted by P1 and $P2^{*a}$. At this point, the polarization state of each pulse when it is output has been rotated by 90 degrees with respect to when it was input to the PBS loop. Consequently, an effect similar to a faraday mirror can be obtained. The other configurations and operations are substantially the same as the first embodiment, and therefore, the description thereof will be omitted.

4. Second Embodiment

In the above-described first embodiment, a final cryptographic key is generated with a degree of security and an amount of key, or a key generation rate, according to a user request. However, according to a second embodiment, user requests are received beforehand, and a plurality of cryptographic keys with a fixed length are generated and stored in advance. That is, a plurality of cryptographic keys corresponding to various degrees of security according to user requests are generated beforehand and stored securely. When a cryptographic key is updated, one of the stored cryptographic keys is selected and output to the encryption/decryption sections. However, in the case of the Vernam cipher, a key and data have the same lengths, and therefore the length of the key is not fixed.

According to the second embodiment of the present invention, a plurality of cryptographic keys corresponding to predetermined degrees of security are generated beforehand as described above, and each of security control sections 120 and 220 is provided with a key storage for storing these cryptographic keys. The security control sections 120 and 220 select a cryptographic key corresponding to a degree of security designated in accordance with a user request and output it to encryption/decryption sections 130 and 230, respectively. Fast key update is possible because cryptographic keys are stored beforehand. Note that the key storage is tamper-resistant. The other part of the second embodiment, including the key generation according to the degree of security and the method for secret communication, is substantially the same as the first embodiment.

5. Third Embodiment

Figure 9:
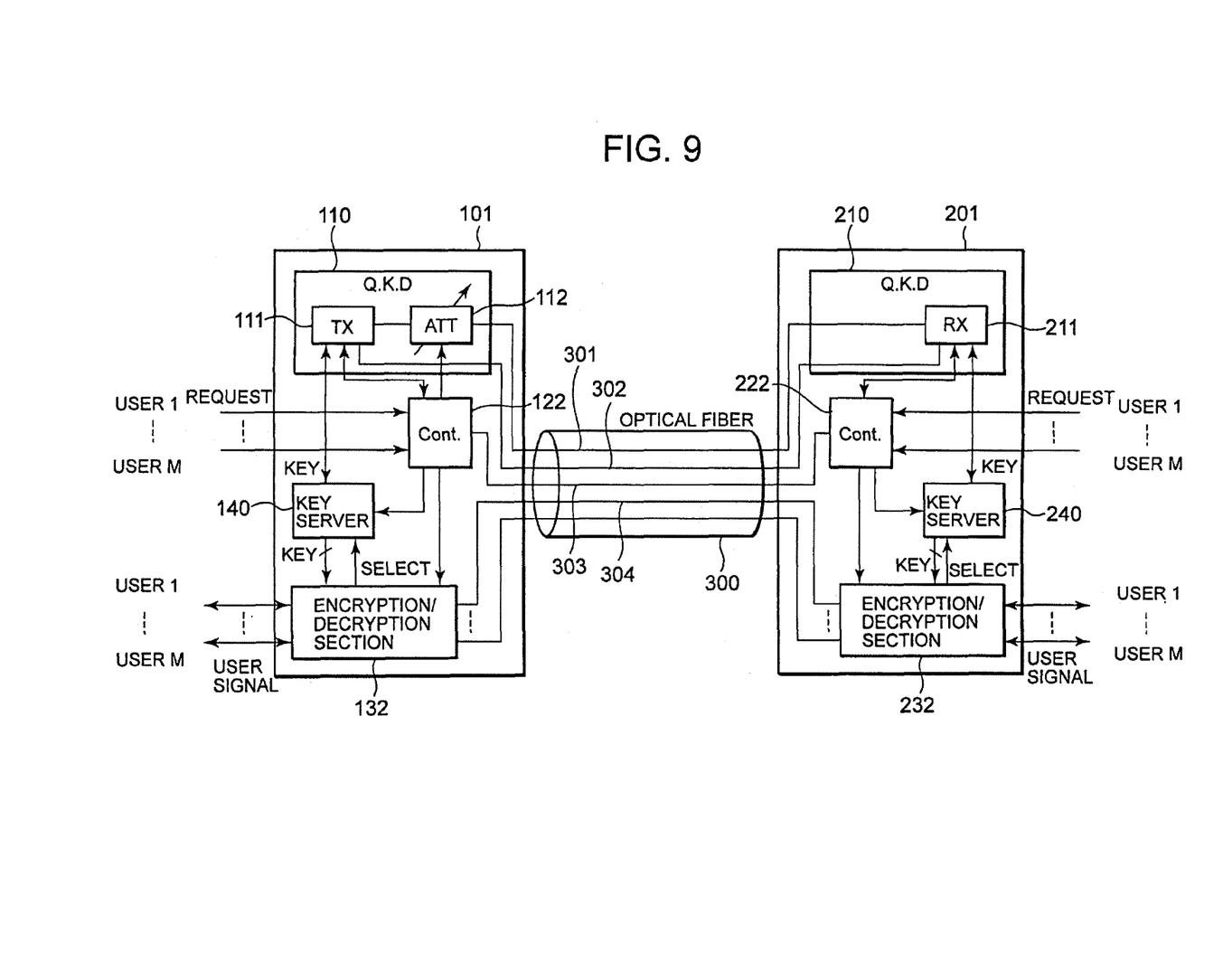
FIG. 9 is a block diagram showing a schematic configuration of a communication system according to a third embodiment of the present invention.

FIG. 9 is a block diagram showing a schematic configuration of a communication system according to a third embodiment of the present invention. The system according to the present embodiment can provide secret communications at respective degrees of security according to requests from a plurality of users.

A sender 101 includes a quantum key distribution (QKD) section 110, a security control section 122, an encryption/decryption section 132, and a key server 140. The QKD section 110, as in the first embodiment, is provided with a QKD transmitter (TX) 111 and a variable optical attenuator (ATT) 112. A receiver 201 includes a quantum key distribution (QKD) section 210, a security control section 222, an encryption/decryption section 232, and a key server 240. The QKD section 210, as in the first embodiment, is provided with a QKD receiver (RX) 211. The security control sections 122 and 222 and the encryption/decryption sections 132 and 232 can handle the secret communication with each of a plurality of users 1 to M.

A plurality of cryptographic keys corresponding to a plurality of predetermined degrees of security are generated beforehand as described above and securely stored and managed by degree of security in each of the key servers 140 and 240. These degrees of security may be those requested by the plurality of users 1 to M beforehand. When a user signal is received from a user, each of the encryption/decryption sections 132 and 232 selects a cryptographic key from the key server 140 or 240, respectively, in accordance with a request from the user and then encrypts or decrypts the user signal, respectively, by using the selected cryptographic key.

Figure 10:
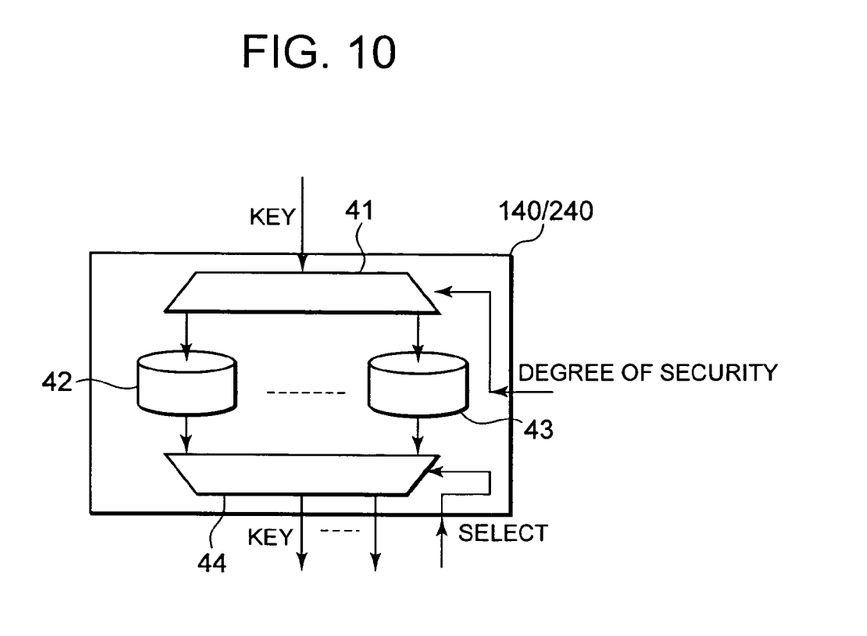
FIG. 10 is a block diagram showing a configuration of a key server in the system according to the third embodiment.

FIG. 10 is a block diagram showing a configuration of the key server in the system according to the third embodiment. As shown in FIG. 10, each of the key servers 140 and 240 has a plurality of key storages 42, 43 corresponding to the respective degrees of security. A cryptographic key is stored in a key storage corresponding to a designated degree of security through a selection section 41, which is given the designated degree of security. A cryptographic key is selected for output from a key storage corresponding to a selected degree of security by a selection section 44, which is notified of the selected degree of security. Needless to say, the key storages 42, 43 are tamper-resistant. The other part of the third embodiment, including the key generation according to the degree of security and the method for secret communication, is substantially the same as the first embodiment.

6. Application Examples

As described above, a final cryptographic key is generated with a degree of security and an amount of key, or a key generation rate, according to a user request, and encryption and decryption of a user signal is performed by using this cryptographic key. In any one of the systems according to the present invention, it is possible to charge for such an encryption/decryption service based on the designated degree of security and amount of key or key generation rate.

For the system configuration, it is possible to provide each of the sender and receiver shown in FIG. 6 or 9 with an accounting function. Alternatively, the accounting function may be provided to a system management device (not shown).

Incidentally, the above-described key generation process carried out by the TX 111 and RX 112, control by the security control sections 120 and 220, operations of the encryption/decryption sections 130 and 230, and accounting function can also be implemented by executing respective corresponding programs on a program-controlled processor or a computer.

The present invention is applicable to secret information communications employing common key distribution technologies typified by quantum key distribution technologies. The quantum key distribution technologies are not limited to the plug and play systems but may be one-way transmission types. The quantum key distribution protocol is not limited to the BB84 protocol, but any of B92, E91 and others can be used without any problems. The above-described embodiments and examples should not be construed as limiting the present invention.

The invention claimed is:

1. A method for generating shared secret information between a first communication device and a second communication device, which are connected through a plurality of communication channels, comprising:

a) setting a degree of security for the shared secret information wherein the degree of security is determined as a function of the amount of the shared secret information and the amount of shared secret information which would remain after full privacy amplification;
  b) the first communication device transmitting first secret information to the second communication device through a quantum communication channel of the plurality of communication channels, wherein the first secret information is transmitted as optical pulses having a mean number of photons per optical pulse determined as a function of the degree of security and having a relationship with the degree of security such that the mean number of photons decreases as the degree of security increases;
  c) the second communication device receiving second secret information through the quantum communication channel, wherein the first and second communication devices both generate third secret information based on the first secret information and the second secret information; and
  d) the first and second communication devices removing, an amount of information from the third secret information, to generate the shared secret information, the amount of information removed from the third secret information being a portion of the amount that would have been removed had full privacy amplification been applied, the portion being determined by the degree of security, the amount of the shared secret information and the mean number of photons.

2. The method according to claim 1, further comprising updating the shared secret information by again performing the steps b) to d).

3. The method according to claim 1, further comprising updating the shared secret information by again performing the steps a) to d).

4. The method according to claim 1, wherein communication between the first communication device and the second communication device using the shared secret information as a cryptographic key is charged for depending on the degree of security set for the shared secret information.

5. The method according to claim 1, further comprising
  e) generating a plurality of pieces of shared secret information by repeating the steps a) to d) and storing the plurality of pieces in a memory; and
  f) when a cryptographic key is to be updated, selecting one piece from the plurality of pieces of shared secret information to use as an updated cryptographic key.

6. The method according to claim 5, wherein the plurality of pieces of shared secret information are grouped under a plurality of degrees of security.

7. A secret communication system, comprising:
  first and second communication devices connected by a plurality of communication channels including a quantum communication channel;
  the first and second communication devices being configured to generate shared secret information, the shared secret information being obtained by:
  at least one of the first and second communication devices being configured to set a degree of security for the shared secret information wherein the degree of security is determined as a function of an amount of the shared secret information and an amount of shared secret information which would remain after full privacy amplification;
  the first communication device being configured to transmit first secret information to the second communication device through the quantum communication channel, wherein the first secret information is transmitted as optical pulses having a mean number of photons per optical puke determined as a function of the degree of security and having a relationship with the degree of security such that the mean number of photons decreases as the degree of security increases;

the second communication device being configured to receive second secret information through the quantum communication channel, wherein the first and second communication devices both generate third secret information based on the first secret information and the second secret information; and the first and second communication devices being configured to remove an amount of information from the third secret information to generate the shared secret information, the amount of information removed from the third secret information being a portion of the amount that would have been removed had full privacy amplification been applied, the portion being determined by the degree of security, the amount of the shared secret information and the mean number of photons.

8. The secret communication system according to claim 7, wherein the first communication device and the second communication device are adapted to communicate by encrypting and decrypting a user signal using the shared secret information as a cryptographic key.

9. The secret communication system according to claim 7, wherein:

the first communication device and the second communication device are adapted to store a plurality of pieces of shared secret information which were previously generated; and wherein when a cryptographic key is to be updated, the first communication device and the second communication device select one from the plurality of pieces of shared secret information to use as an updated cryptographic key.

10. The secret communication system according to claim 7, wherein:

the first communication device and the second communication device store a plurality of pieces of shared secret information which were previously generated;

the plurality of pieces of shared secret information are grouped under a plurality of degrees of security; and the first communication device and the second communication device select one from the plurality of pieces of shared secret information to use as a new cryptographic key depending on the degree of security when updating cryptographic keys using shared secret information.

11. The secret communication system according to claim 7, wherein communication between the first communication device and the second communication device using the shared secret information as a cryptographic key is charged for depending on the degree of security set for the shared secret information.

12. The secret communication system according to claim 7, wherein the plurality of communication channels are multiplexed on an optical fiber transmission line.

13. The secret communication system according to claim 12, wherein the amount of information that is removed in privacy amplification processing is proportional to an amount of the third information that is changed, wherein the proportion depends on the degree of security.

14. The secret communication system according to claim 12, wherein the first communication device further comprises a variable attenuator for changing the mean number of photons in an optical pulse sent over the quantum communication channel.

15. The secret communication system according to claim 12, wherein each of the first communication device and the second communication device further comprises a secret communication section for encrypting and decrypting a user signal using the shared secret information.

16. The secret communication system according to claim 12, further comprising:

a memory for storing a plurality of pieces of shared secret information which were previously generated; and a secret information controller for selecting one from the plurality of pieces of shared secret information when the plurality of pieces of shared secret information is updated.

17. The secret communication system according to claim 12, further comprising:

a memory for storing a plurality of pieces of shared secret information which were previously generated, wherein the plurality of pieces of shared secret information are grouped under a plurality of degrees of security; and a secret information controller for selecting one from the plurality of pieces of shared secret information depending on the degree of security when the plurality of pieces of shared secret information is updated.

18. The secret communication system according to claim 12, further comprising a charging section for charging for communication using the shared secret information depending on the degree of security set for the shared secret information.

* * * * *